United States Patent
Murillo et al.

(10) Patent No.: US 9,764,677 B2
(45) Date of Patent: Sep. 19, 2017

(54) ASSISTANCE STRAP FOR ACCESS TO CARGO CONTAINER

(71) Applicant: Ancra International LLC, Azusa, CA (US)

(72) Inventors: Jeffrey Jay Murillo, Spring, TX (US); Howard T. Knox, Independence, KY (US)

(73) Assignee: Ancra International LLC, Azusa, CA (US)

( * ) Notice: Subject to any disclaimer, the term of this patent is extended or adjusted under 35 U.S.C. 154(b) by 0 days.

(21) Appl. No.: 15/133,748

(22) Filed: Apr. 20, 2016

(65) Prior Publication Data

US 2016/0375818 A1    Dec. 29, 2016

Related U.S. Application Data

(60) Provisional application No. 62/286,681, filed on Jan. 25, 2016, provisional application No. 62/183,971, filed on Jun. 24, 2015.

(51) Int. Cl.

| | |
|---|---|
| *B61D 45/00* | (2006.01) |
| *B60P 7/06* | (2006.01) |
| *B60P 7/08* | (2006.01) |
| *B64D 9/00* | (2006.01) |

(52) U.S. Cl.
CPC ........... *B60P 7/0823* (2013.01); *B60P 7/0807* (2013.01); *B60P 7/0815* (2013.01); *B61D 45/001* (2013.01)

(58) Field of Classification Search
CPC ......... B60P 7/08; B60P 7/0815; B60P 7/0823; B60P 7/0807; B61D 45/001
USPC ..... 248/500, 503.1, 503; 410/101, 104, 105, 410/108; 244/118.6
See application file for complete search history.

(56) References Cited

U.S. PATENT DOCUMENTS

| | | | | |
|---|---|---|---|---|
| 3,282,229 | A | * 11/1966 | Elsner | B60P 7/0815 410/105 |
| 3,605,637 | A | * 9/1971 | Prete, Jr. | B60P 7/0815 410/105 |
| 4,256,424 | A | * 3/1981 | Knox | B64D 9/003 410/104 |
| 4,502,181 | A | 3/1985 | Gonas | |
| 4,771,969 | A | * 9/1988 | Dowd | B64D 11/0696 244/118.6 |
| 4,862,554 | A | 9/1989 | Chojnacki | |
| 4,867,623 | A | * 9/1989 | Loyd | B61D 45/001 248/500 |
| 4,912,808 | A | 4/1990 | Blakely | |
| 5,020,948 | A | 6/1991 | Ihara | |
| 6,149,361 | A | 11/2000 | Schrader | |

(Continued)

FOREIGN PATENT DOCUMENTS

| | | |
|---|---|---|
| DE | 203 09 342 U1 | 10/2003 |
| DE | 20 2005 012 035 U1 | 11/2005 |

(Continued)

*Primary Examiner* — Tan Le
(74) *Attorney, Agent, or Firm* — Brinks Gilson & Lione

(57) ABSTRACT

A device for use with a cargo compartment is provided. The device includes a fitting configured to engage a hole in a logistics track, the fitting comprising a ring that rotatably extends therefrom. An elongate strap is fixed to the ring, wherein the elongate strap extends to a free end portion, the elongate strap extends between a first end portion and a second end portion.

12 Claims, 10 Drawing Sheets

(56) References Cited

U.S. PATENT DOCUMENTS

| | | | |
|---|---|---|---|
| 6,935,819 B2 * | 8/2005 | Squyres | B60P 7/0815 410/104 |
| 7,357,610 B2 * | 4/2008 | Squyres | B60P 7/0815 410/104 |
| 7,934,294 B1 | 5/2011 | Janes | |
| 2009/0134613 A1 | 5/2009 | Eber et al. | |

FOREIGN PATENT DOCUMENTS

| | | |
|---|---|---|
| DE | 20 2011 004 670 U1 | 4/2012 |
| JP | 11 099868 | 4/1994 |
| WO | 2008/089991 A1 | 7/2008 |

* cited by examiner

ASSISTANCE STRAP FOR ACCESS TO CARGO CONTAINER

CROSS-REFERENCE TO RELATED APPLICATIONS

This application claims priority from U.S. Provisional Application No. 62/183,971, filed on Jun. 24, 2015, and from U.S. Provisional Application No. 62/286,681, filed on Jan. 25, 2016, the entirety of each are hereby fully incorporated by reference herein.

TECHNICAL FIELD

The subject specification relates to equipment used to assist with access for loading and unloading of a cargo compartment of a truck or other vehicle.

BRIEF SUMMARY

A first representative embodiment of the disclosure is provided. The embodiment includes a device for use in accessing a cargo compartment. The device includes a fitting configured to engage a hole in a logistics track, the fitting comprising a ring that rotatably extends therefrom. An elongate strap is fixed to the ring, wherein the elongate strap extends to a free end portion, the elongate strap extends between a first end portion and a second end portion.

Another representative embodiment of the disclosure is provided. The embodiment includes a device for attaching a load to a fixed track. The device includes a fitting configured to engage a hole in a fixed logistics track. The fitting comprises a keeper with one or more fingers that extend from opposite sides of a bottom portion of a body of the keeper, the fitting comprises a lever that is pivotably connected to the body, the fitting further comprises a lock that selectively restricts rotation of the lever with respect to the body.

Yet another representative embodiment of the disclosure is provided. The embodiment includes a strap for use in accessing a cargo compartment. The strap includes a fitting configured to engage a hole in a logistics track. The fitting includes a keeper with one or more fingers that extend from opposite sides of a bottom portion of a body of the keeper, and a ring that rotatably extends therefrom, the fitting comprises a lever that is pivotably connected to a body of the keeper. A lock selectively restricts rotation of the lever with respect to the body. An elongate strap is fixed to the ring, wherein the elongate strap extends to a free end portion, the elongate strap extends between a first end portion and a second end portion.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION OF THE DRAWINGS AND THE PRESENTLY PREFERRED EMBODIMENTS

Figure 1:
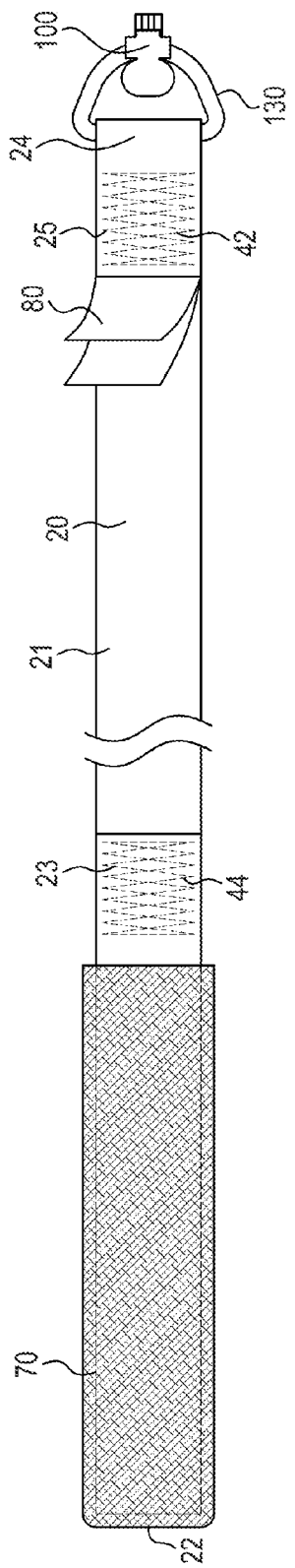
FIG. 1 depicts a top view of a device for use with a cargo compartment to assist with access to the cargo compartment.
Figure 2:
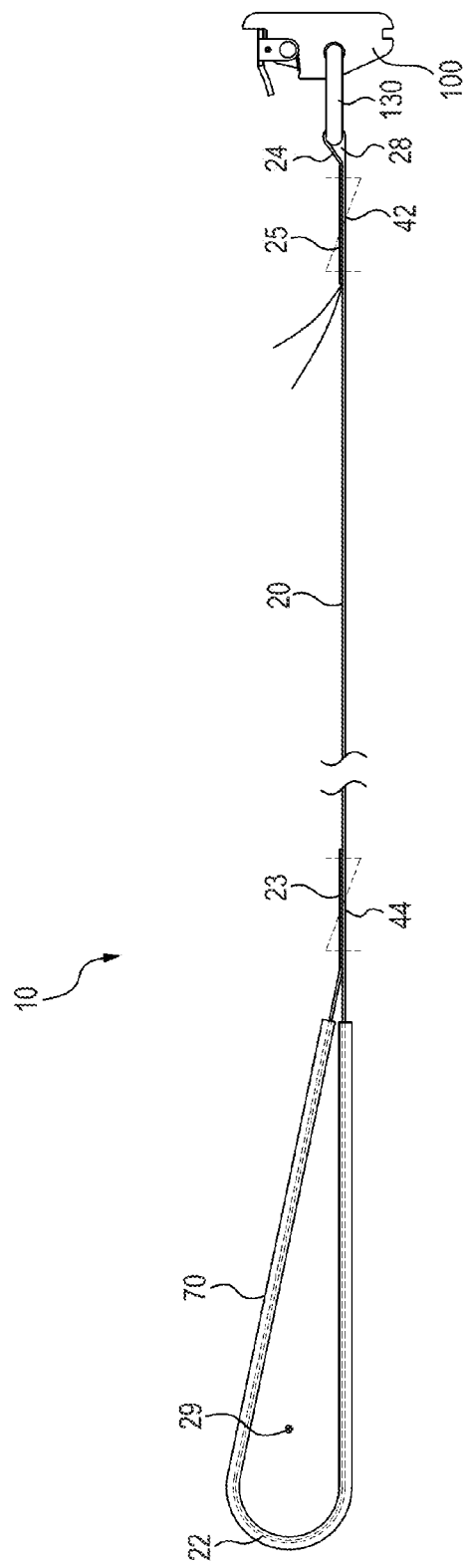
FIG. 2 is a side view of the device of FIG. 1.

Turning now to FIGS. 1-4, an access assistance device 10 is provided. The device 10 is adapted for use by a person, such as a driver or a dock worker, for allowing the person to access the cargo compartment 1050 of a truck, or another space that is at a higher position than the surface upon which the person stands upon. As discussed further below, the device 10 may be removably connected to a side wall 1012 of a cargo compartment 1000, or in other embodiments, the device 10 may be removably connected to a floor 1060 of the cargo compartment 1000.

In some embodiments, the device 10 may be configured to removably attach to a track 1040 that is disposed within the cargo compartment 1050, such as on a side wall 1012 or on the floor 1060 of the cargo compartment 1050. For example, the device 10 may be configured to attach to a conventional "A" or "E" track, or another type of fixed track that may be mounted upon the side walls 1012 or the floor of a cargo compartment 1000.

The device 10 is formed from an elongate strap 20 that is fixed to a keeper 100. The elongate strap 20 extends between first and second ends 23, 25 and may be assembled such that the strap 20 extends between a first end portion 24 that is fixed to the keeper 100 and an opposite second end portion 22 that is configured to be grabbed or otherwise manipulated by the user, such as with their hand. The strap 20 includes a central portion 21 that extends between the first and second ends 23, 25, and to which the first and second ends 23, 25 may be fixed, as discussed below.

The strap 20 may be formed from convention strapping that is used in the cargo control industry, such as webbing. In some embodiments, the strap 20 may be about 3 feet long when assembled, with the strap 20 being about 4 or 5 feet long before assembly. In other embodiments, the strap 20 may be other lengths, such as 2 feet, 2.5 feet, 3.5 feet, 4.5 feet, and the like.

The strap 20 may be formed to include a loop 28 at the second end portion 24, the loop 28 may extend through a ring 130 of the keeper 100, discussed below, to connect the strap 20 to the keeper 100. The loop may be formed by mating the second end 25 of the strap 20 to the central portion 21 of the strap 20, such that the two portions of the strap mate with surface to surface contact. In some embodiments, these portions of the strap 20 may be fixed to each other (to maintain the loop) with stitching (shown schematically in the figures as 42), adhesive, melting together, with fasteners (grommets, screws/nuts, staples, bindings, or the like) or with other ways known in the art to secure two portions of a strap together with surface to surface contact.

Alternatively, the strap 20 may be formed without a loop 28, and may be fixed to the ring 130 with other structure, such as a ring that is fixed to the first end portion 24 of the strap, with fasteners, adhesive, sewing, or the like.

The strap 20 may additionally form a first loop 29, which is arranged at the first end portion 22 of the strap 20. The first loop 29 may be configured to be held by the user's hand. The first loop 29 may be formed by mating the first end 23 of the strap to the central portion 21 the strap, such that the two portions of the strap mate with surface to surface contact. In some embodiments, these portions of the strap 20 may be fixed to each other (to maintain the loop) with stitching (shown schematically in the figures as 44), adhesive, melting together, with fasteners (grommets, screws/nuts, staples, bindings, or the like) or with other ways known in the art to secure two portions of a strap together with surface to surface contact.

The first loop 29 may be about 8 inches to about 16 inches (i.e. the length of the opening loop) when the strap 20 is straight, while in other embodiments the first loop 29 may be longer, such as about 18 inches, inches or the like, or shorter, such as 6 inches. The term "about" herein is defined as including the exact length specified, as well as lengths that are one inch shorter and one inch longer than the specified length. One of ordinary skill in the art with a thorough review of the subject specification and drawings will understand that the device 10, and its various components discussed herein, may be manufactured with different lengths and other dimensions depending upon the size of the cargo compartment 1000 that is envisioned to be used with the device, with these changes in parameters being contemplated by this disclosure.

Figure 4:
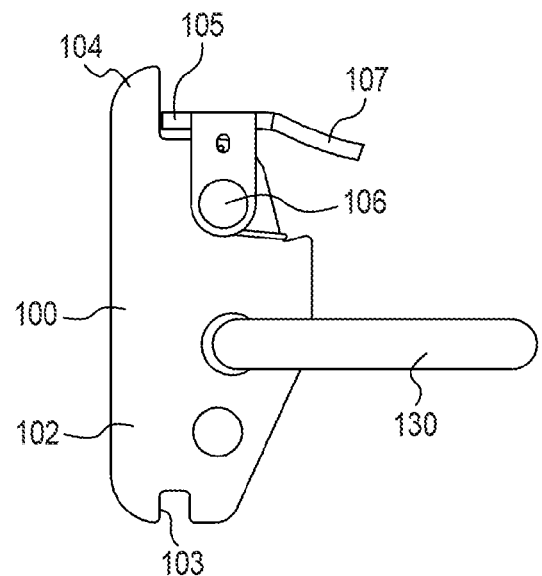
FIG. 4 is a side view of a keeper of the device of FIG. 1.

As discussed above, the strap 20 is connected to a keeper 100, such as by a ring 130 that extends from the keeper 100. The keeper 100 is configured to connect with, and in some embodiments extend through, an aperture 1042 in a logistics track 1040 that is fixed to a side wall 1012 or a floor 1060 of the cargo compartment 1000. The keeper 100 is best shown in FIG. 4, and includes a body 102, a lower indent 103, an upper tooth 104, and a lever 107. The keeper 100 is configured such that, when installed within an aperture 1042 in a track 1040, the lower indent 103 rests upon the bottom edge 1042a of the aperture, and the upper tooth 104 extends behind the upper edge 1042b of the aperture. The keeper may additionally include a lever 107 that maintains the keeper fixed to the aperture, and may be rotated to allow the keeper to be removed from the aperture, normally by lifting the keeper vertically within the aperture to allow the bottom edge (and lower indent 103) to be above the bottom edge 1042a of the aperture and therefore pulled free of the aperture.

In some embodiments, the strap 20 may additionally include one or more markings upon the central portion 21 (and/or the end portions 22, 24) of the strap, such as trademarks of the seller or buyer, instructions for use, classification of the strap, working limits (e.g. weight limits of the strap) and the like. In some embodiments, the strap 20 may support one or more labels 80 that extend therefrom, which may include the same or additional information as printed on the strap 20 (such as warnings, etc.). The labels 80 may be fixed to the strap 20, such as between the two portions of the strap 20 that are fixed together.

Figure 3:
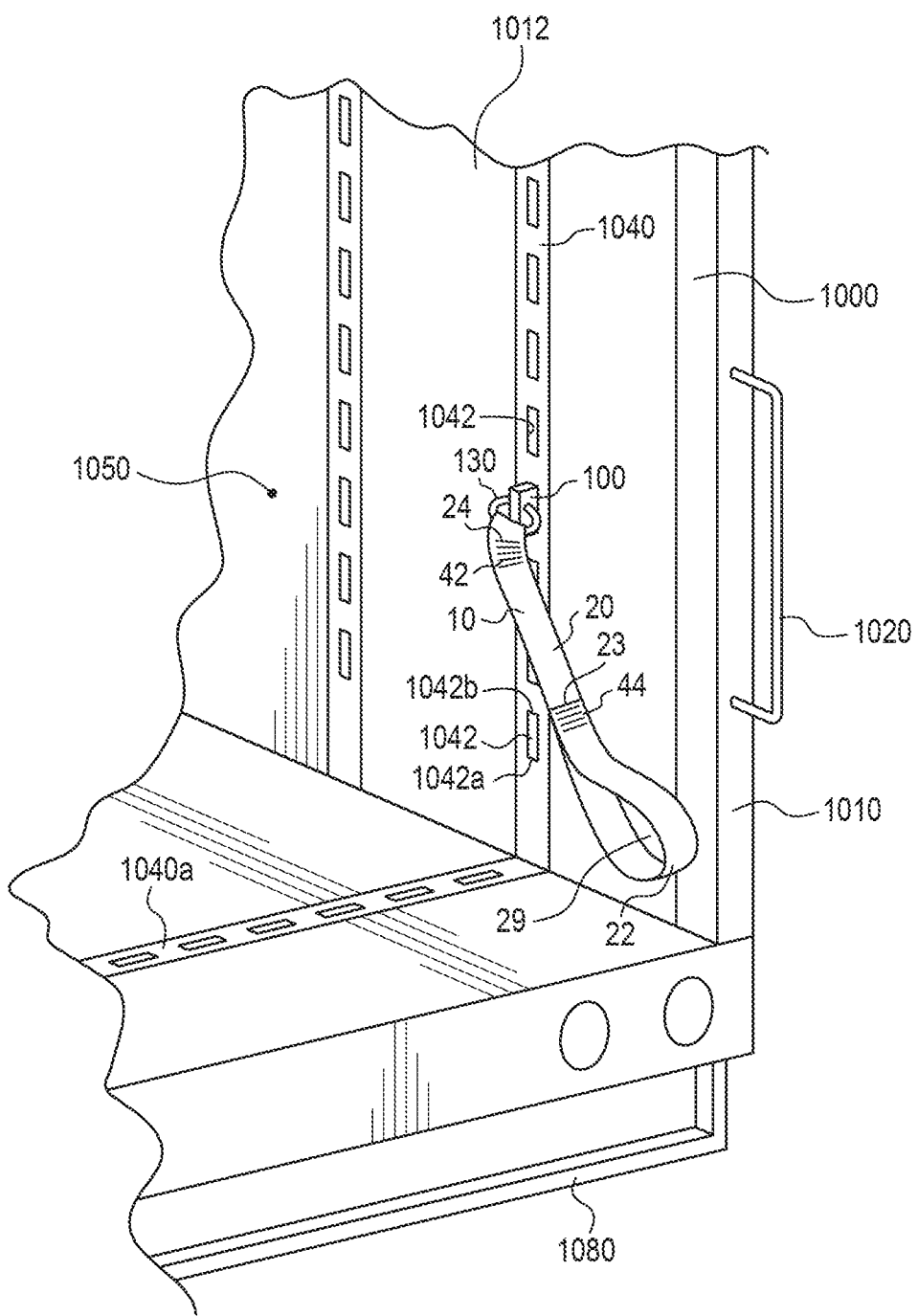
FIG. 3 is a perspective view of the device of FIG. 1 attached to a logistics track disposed upon a side wall of a cargo compartment.

As best shown in FIG. 3, the device 10 may be fixed to a logistics track, mounted upon a sidewall 1012 or a floor 1060, and the first end portion 22 of the strap 20 is available for a user (such as a driver or a dock worker) to ergonomically hold when they climb into the cargo compartment 1000 to provide support for the user and to assist the user with pulling themselves into the cargo compartment. In some embodiments, the cargo compartment 1000 may additionally include a step 1080 that is provided to allow the user to step onto when climbing into the interior 1050 of the cargo compartment 1000. The device 10 may be positioned such that the second end portion 22 may be grabbed by the user when the user stands upon the step 1080. In some embodiments, the cargo compartment may additionally include a handle 1020 that is fixed thereto, such as upon the rearward facing frame of the cargo compartment 1000. The device 10 may be positioned such that the driver may grab the first end portion 22 with one hand, and grab the handle 1020 with a second hand to allow the user to use both hands when pulling themselves into the cargo compartment 1000.

In some embodiments, the keeper 100 may be configured to engage holes in conventional "A" track, conventional "E" track, or other logistics tracks (whether mounted horizontally or vertically) that are typically fixed to the sidewall 1012 or the floor 1060 (track 1040a) of the cargo compartment 1000. In other embodiments, the keeper 100 may be fixed to a track (not shown, but similar to track 1040a) that is mounted to the ceiling of the cargo compartment.

As can be understood with reference to FIG. 3, the device 10 is configured to be fixed to a portion of a cargo container 1000 such that the first end portion 22, and specifically the first loop 29 is configured to be ergonomically manipulated by a user's hand. As discussed above, the device 10 may be configured to be ergonomically manipulated when the user is simultaneously stepping or standing upon a step 1080 and/or are holding the handle 1020 with their other hand.

In some embodiments, the first loop 29 may include a sleeve 70 that surrounds the strap 20, around the entire loop 29 or around a portion of the loop 29. The sleeve 70 may be made to allow the strap to be more ergonomically held by the user, such as with ridges, or other features that allow for holding, or with a round, elliptical or another profile that is more easily held than the generally flat strap 20. In some embodiments, the sleeve 70 may be made from a material that is comfortably held by a user.

Figure 15:
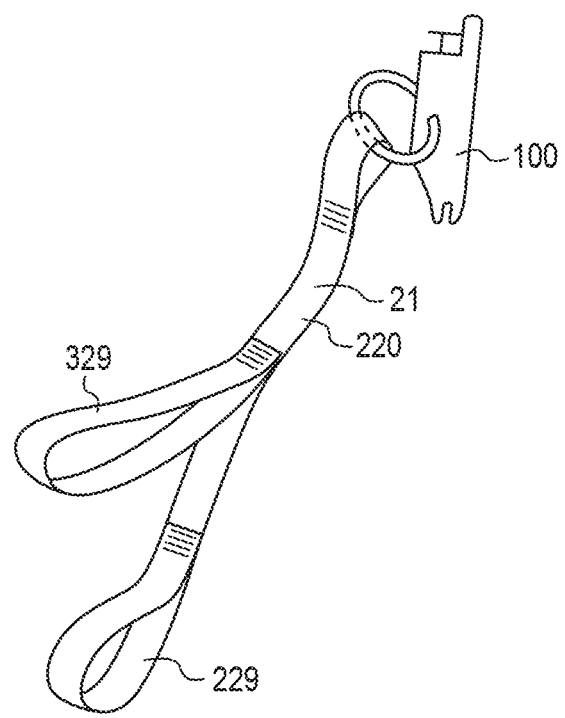
FIG. 15 is a view of an alternate strap usable with the locking keepers of the specification.

Turning now to FIG. 15, a modified strap 220 may be provided. The strap 220 may be fixed to the keeper 100 as discussed above, or keepers 2000, 3000 as discussed below, or may be used in conjunction with other devices used for rigging or securement of cargo. The strap 220 may be constructed in the same manner as the strap 20 discussed above, but include two or more loops that allow both of a user's hands to hold onto the strap, or allow the user to use the same hand to sequentially hold onto the two or more loops (such as with the user holding onto the cargo container with their other hand) to provide additional support for the user as they climb into the cargo compartment.

A first loop 229 may be disposed at the end of the strap 20 and may be constructed as discussed above with respect to the first loop 29, and may use the same webbing material as the strap 20. A second loop 329 may be provided and fixed to the central portion 221 of the strap 220, such as by one or more of stitching, adhesive, melting together, fasteners or other ways known in the art to secure two portions of webbing together with surface to surface contact. The second loop 329 may be provided about 1, 2, or 3 feet away from the first loop 229 (or other distances that would be ergonomically effective as would be understood by one of ordinary skill in the art after a thorough review of the subject specification with routine optimization). In these embodiments, the central portion 221 of the strap (and therefore the entire strap before assembly) may be longer to provide space for the second loop 329 as discussed above. In other embodiments, a handle that is not made from webbing, or that is made from different webbing from the strap may be fixed to the strap 320 to form the second loop 329. One of ordinary skill in the art will understand that more than two loops may be provided as well.

Turning now to FIGS. 5-9, a modified keeper 2000 is provided. The keeper 2000 may be used to support an access assistance device, like those discussed herein, or the keeper 2000 may support other straps, hooks, and other lifting, supporting, or rigging components that are known in the art. For the sake of brevity, the keeper 2000 will be described with respect to an access assistance device although one of ordinary skill in the art with a thorough review of this specification will understand that the keeper 2000 is used to support other components in a like manner.

Figure 5:
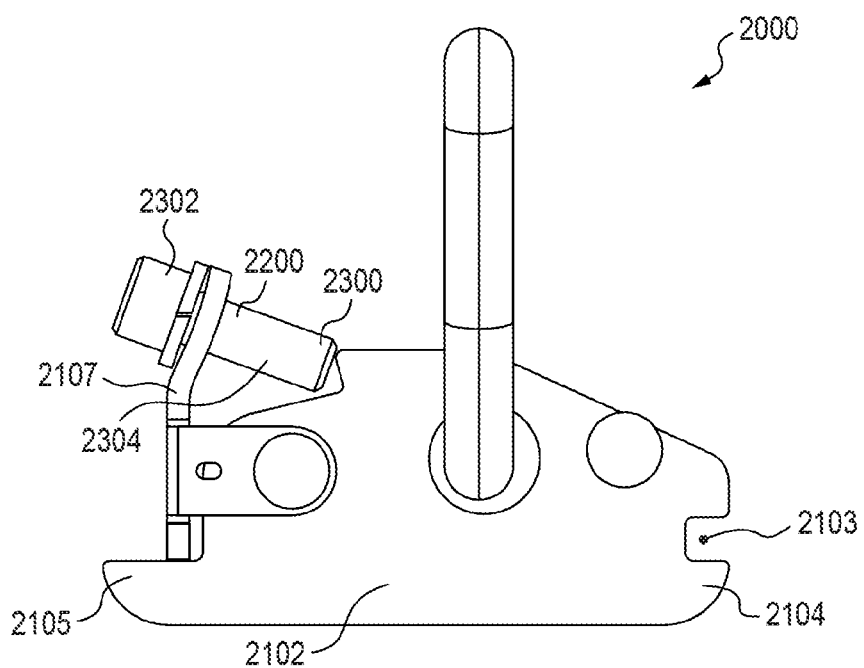
FIG. 5 is a side view of a keeper with a lever and a lock with the lock in a locking position.

The keeper 2000 is configured to connect with, and in some embodiments extend through, an aperture 1042 in a logistics track 1040 that is fixed to a side wall 1012 or a floor 1060 of the cargo compartment 1000. The keeper 2000 is best shown in FIG. 5, and includes a body 2102, a lower indent 2103, a lower tooth 2104, an upper tooth 2105, and a lever 2107. The keeper 2000 may pivotably or rigidly support a ring 3110, or in other embodiments, the keeper 2000 may support a hook or other known conventional rigging component.

The keeper 2000 is configured such that, when the body 2102 is positioned within an aperture 1042 in a track 1040, the lower indent 2103 rests upon the bottom edge 1042a of the aperture, and the upper tooth 2105 extends behind the upper edge 1042b of the aperture. The keeper additionally includes a lever 2107 that maintains the keeper fixed to the aperture, in some embodiments by minimizing the distance that the keeper 2100 can slide vertically within the aperture, and the lever 2107 may be rotated to allow the keeper to be removed from the aperture 1042, normally by lifting the keeper vertically within the aperture 1042 to allow the bottom edge (and lower indent 103) to be above the bottom edge 1042a of the aperture and then rotated to clear the upper tooth 2105 from the aperture.

The lever 2107 is pivotally mounted to the keeper such that when the lever 2107 is in an locking position (FIG. 5) the lever extends within a portion of the aperture 1042 upon the logistics track, and specifically into the top of the aperture such that the keeper 2000 cannot be raised vertically as necessary for the lower indent 2103 (and the lower tooth 2104) to clear the bottom edge 1042a of the aperture, to allow the keeper to be rotated such that the upper tooth 2105 can be withdrawn from the upper edge 1042b of the aperture.

The lever 2107 can be rotated to the removal position (FIG. 7) where the lever 2107 is withdrawn from the aperture to allow the keeper 2100 to be initially raised vertically within the aperture (to allow the lower indent 2013 and lower tooth to clear the bottom edge 1042a of the aperture). In some embodiments, the lever 2107 is biased into the locking position by a spring or the like.

Figure 6:
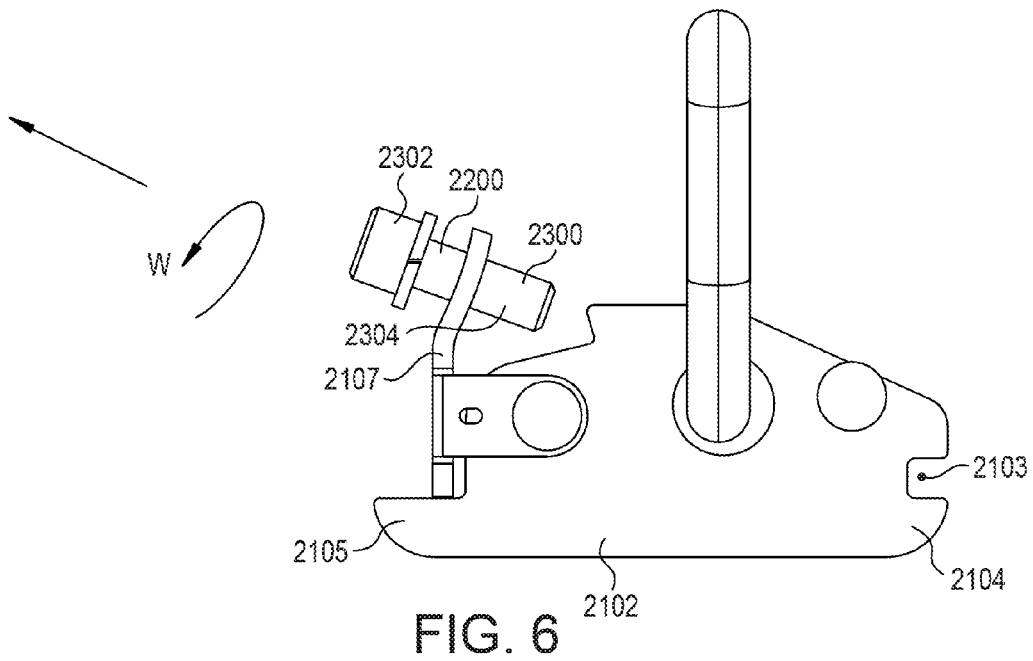
FIG. 6 is the view of FIG. 5 with the lock translated away from the locking position.
Figure 7:
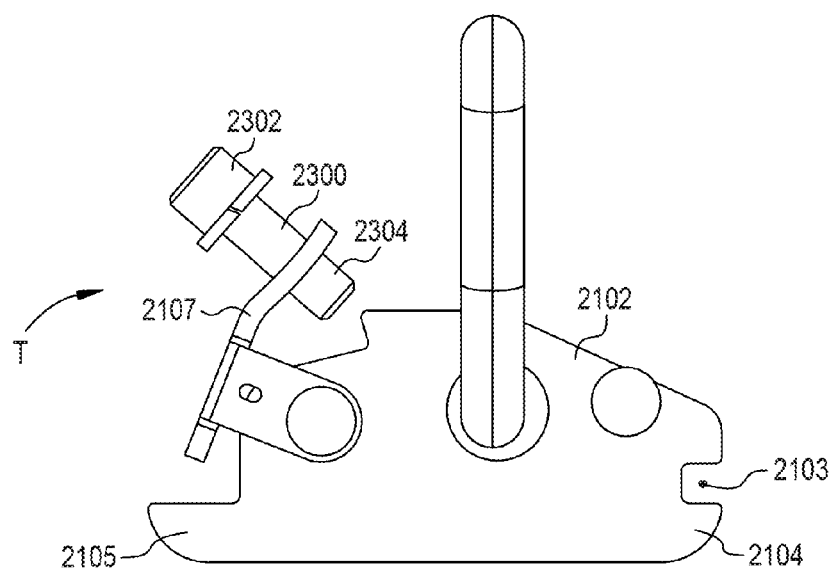
FIG. 7 is the view of FIG. 6 with the lever rotated with respect to the body of the keeper.
Figure 8:
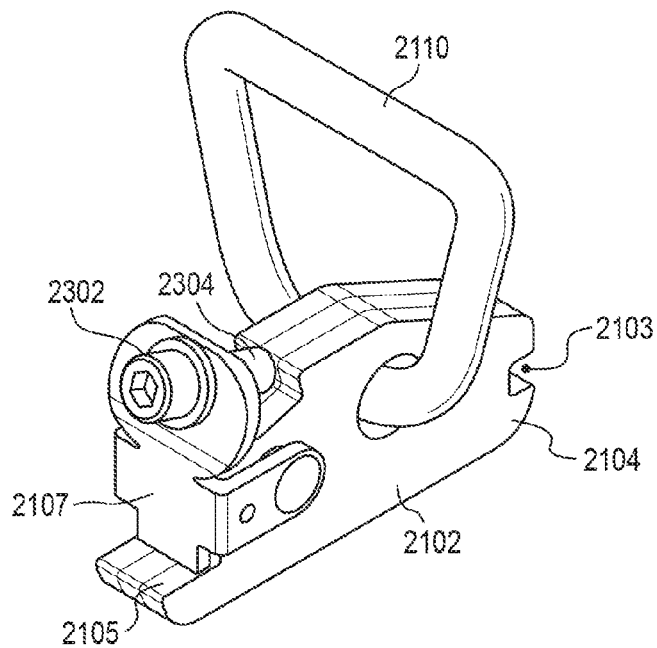
FIG. 8 is a perspective view of the keeper in the orientation of FIG. 5.
Figure 9:
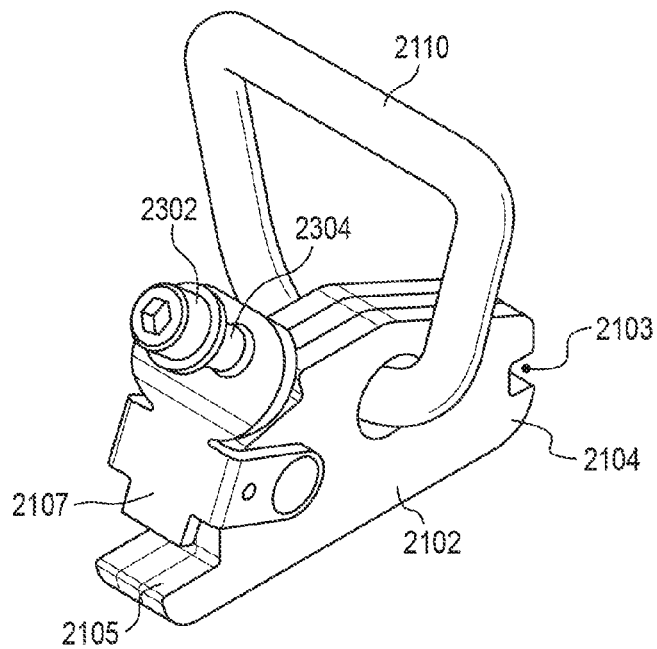
FIG. 9 is a perspective view of the keeper in the orientation of FIG. 7.

The keeper 2000 further comprises a lock 2200 that selectively engages the lever 2107 to prevent the lock 2107 from rotating to the removal position. In some embodiments, the lock 2200 may be a screw 2300 that threads into a tapped aperture the lever 2107 and such that the depth of the shaft 2304 of the screw through the lever 2107 can be adjusted by the user. As depicted in FIG. 5, the screw 2300 may be inserted through the lever 2107 such that the shaft 2304 contacts the body 2102 of the keeper when the lever is in the locking position, which prevents the lever 2107 from rotating toward the removal position. As depicted in FIG. 6, the rotation of the screw 2300, such as in the direction W, causes the shaft to translate away from the body 2102 of the keeper. The space created between the shaft 2304 and the body 2102 allows the lever 2107 to rotate with respect to the body. With sufficient rotation of the screw 2300, the lever 2107 is free to rotate about the body 2102 such that the lever 2107 can reach the removal position, to allow the keeper 2000 to be slid upwardly within the aperture 1042 to clear the lower tooth 2104 from the bottom edge 1042a of the aperture, and therefore allow the keeper to be pivoted out of the aperture 1042.

Figure 13:
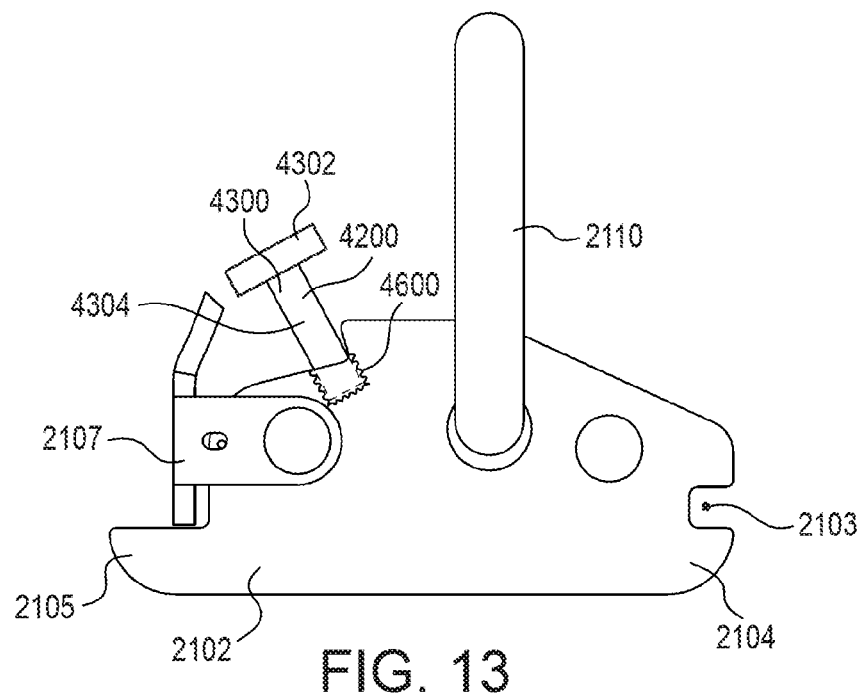
FIG. 13 is a side view of yet another keeper with a lever and a lock with the lock in the locking position.
Figure 14:
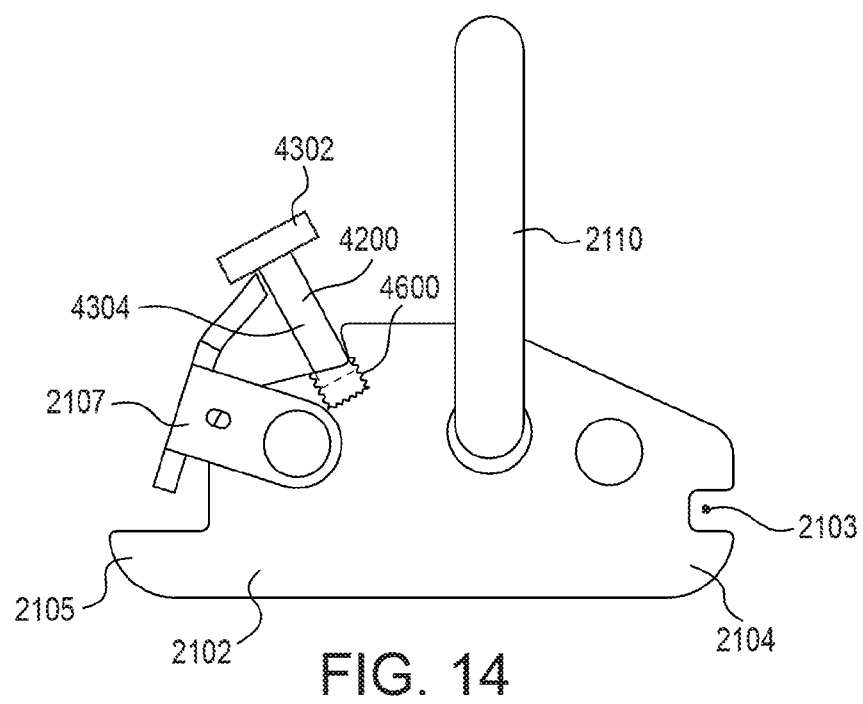
FIG. 14 is the view of FIG. 13 with the lock translated away from the locking position and the lever rotated with respect to the body of the keeper.

In other embodiments depicted in FIGS. 13-14, the lock may be a screw that is threaded into a threaded aperture 4600 within the body 2102, such that when positioned within the body 2102, the head 4302 of the screw 4200 (or a washer upon the shaft 4304 of the screw, or the shaft 4304 itself) contacts the lever 2107 (or is in close proximity to the lever 2107) to prevent the lever 2107 from rotating with respect to the body 2102 of the keeper, as shown in FIG. 13. In embodiments where the head 4302 of the screw 4300 contacts the lever 2107, the head clears the lever 2107 when the screw 4300 is rotated to translate outward from the body 2102, and with the head 4302 clearing the lever 2107, the lever 2107 becomes free to rotate to the removal position, with the screw 4300 still threaded into the body 2102 as depicted in FIG. 14. In other embodiments, the removal of the screw 4300 from the body 2102 allows the lever 2107 to rotate with respect to the body 2102. The embodiments disclosed in this specification that discuss a screw may be a screw like fastener, such as a fastener driven by a conventional screw driver, an allen wrench, or a specific screw driver. In other embodiments, the screw may be a knurled thumb screw that can be driven in either direction with only a user's fingers. The screw may be driven with other tools, or without tools as well.

In other embodiments, the lock may be constantly fixed to the keeper 2000, while the lock is movable with respect to the keeper to selectively prevent or allow rotation of the lever 2107 (with a tool or a user's fingers), between positions similar to those depicted in FIGS. 13 and 14 as depicted with respect to embodiment discussed above. For example, the lock may have a head (or enlarged portion) that is biased toward a position that engages (or is in close proximity) to the lever 2107, while the lock may be moved to a position that allows the lever 2107 sufficient space to rotate as necessary to clear the aperture for removal of the keeper 2000 from the aperture in the logistics track. For example, the lock may have a head that longitudinally moves along a shaft, with the head being in a lower position (to contact the lever and therefore prevent its movement) and the head being movable to a second position to allow movement of the lever 2107 with respect to the body 2102. The head may be biased toward the lower position by a spring.

Figure 10:
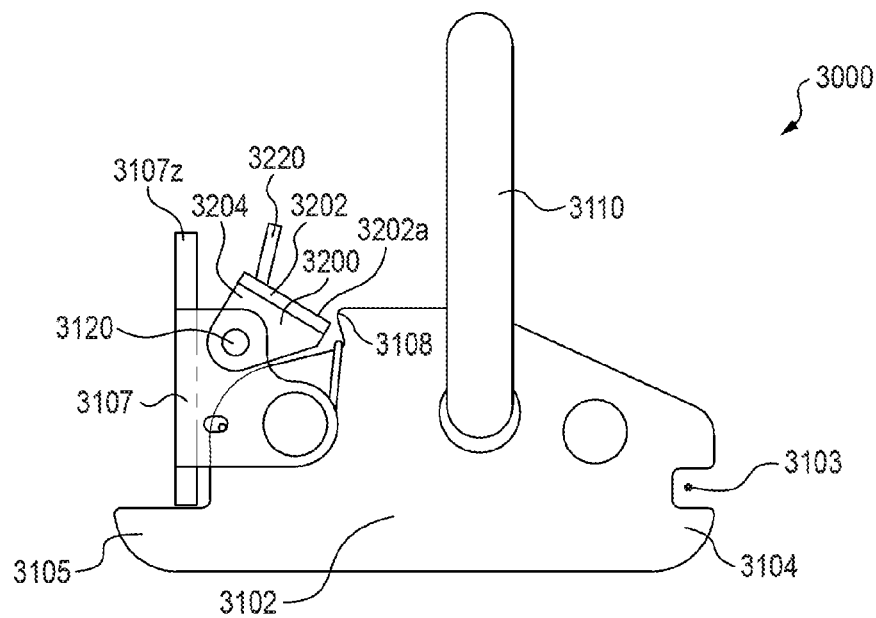
FIG. 10 is a side view of another keeper with a lever and a lock with the lock in the locking position.
Figure 11:
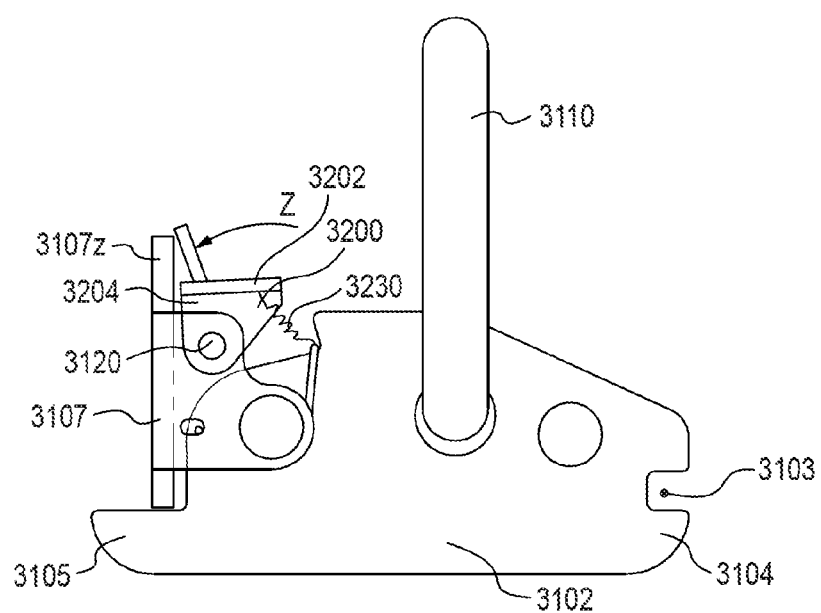
FIG. 11 is the view of FIG. 10 with the lock rotated away from the locking position.
Figure 12:
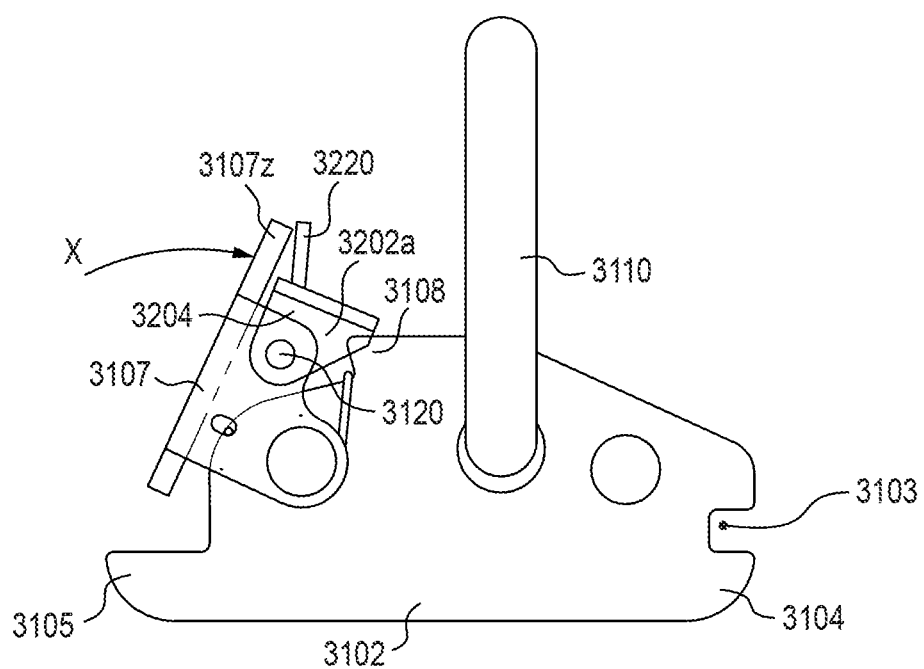
FIG. 12 is the view of FIG. 11 with the lever rotated with respect to the body of the keeper.

Turning now to FIGS. 10-12, another keeper 3100 is provided. The keeper 3100 may be used to support an access assistance device, like those discussed herein, or the keeper 3100 may support other straps, hooks, and other lifting, supporting, or rigging components that are known in the art. For the sake of brevity, the keeper 3100 will be described with respect to an access assistance device although one of ordinary skill in the art with a thorough review of this specification will understand that the keeper 3100 is used to support other components in a like manner.

The keeper 3100 is configured to connect with, and in some embodiments extend through, an aperture 1042 in a logistics track 1040 that is fixed to a side wall 1012 or a floor 1060 of the cargo compartment 1000. The keeper 3100 includes a body 3102, a lower indent 3103, a lower tooth 3104, an upper tooth 3105, and a lever 3107. The keeper 3100 may pivotably or rigidly support a ring 3110, or in other embodiments, the keeper 3100 may support a hook or other known conventional rigging component.

The keeper 3100 is configured such that, when installed within an aperture 1042 in a track 1040, the lower indent 3103 rests upon the bottom edge 1042*a* of the aperture, and the upper tooth 3105 extends behind the upper edge 1042*b* of the aperture. The keeper additionally includes include a lever 3107 that maintains the keeper fixed to the aperture 1042, in some embodiments by minimizing the distance that the keeper 3100 can slide vertically within the aperture 1042, and the lever 3107 may be rotated to allow the keeper to be removed from the aperture 1042, normally by lifting the keeper 2100 vertically within the aperture 1042 to allow the bottom edge (and lower indent 2103) to be above the bottom edge 1042*a* of the aperture and then rotated to clear the upper tooth 3105 from the aperture 1042.

The lever 3107 is pivotably mounted to the keeper such that when the lever 3107 is in an locking position (FIG. 10) the lever 3107 extends within a portion of the aperture 1042 upon the logistics track, and specifically into the top of the aperture 1042 such that the keeper 3100 cannot be raised vertically as necessary for the lower indent 3103 (and the lower tooth 3104) to clear the bottom edge 1042*a* of the aperture, to allow the keeper to be rotated such that the upper tooth 3105 can be withdrawn from the upper edge 1042*b* of the aperture.

The lever 3107 can be rotated to the removal position (FIG. 12) where the lever 3107 is withdrawn from the aperture to allow the keeper 3100 to be initially raised vertically within the aperture (to allow the lower indent 3103 and lower tooth to clear the bottom edge 1042*a* of the aperture). In some embodiments, the lever 3107 is biased into the locking position by a spring or the like.

The keeper 2100 further comprises a lock 3200 that is movable with respect to the lever 3107 and the keeper 3100 between a locking position (FIG. 10) where the lock 3200 is disposed in contact with (or in close proximity to) the body 3102 of the keeper to prevent the lever 3107 from rotating (or to minimize the distance of potential rotation of the lever 3107), and a release position (FIG. 11) where the lock 3200 is moved to provide clearance with the body 3102 of the keeper to allow the lever 3107 to rotate to the removal position (FIG. 12).

In some embodiments, the lock 3200 may be pivotably mounted to the lever 3107 with a pin or hinge 3120. The lock 3200 may include a roof 3202 and one or two opposed walls 3204 that extend from one or both of the opposite edges 3202*a* of the roof 3202 and connect with the lever 3107 with the pin 3120. The lock may be formed from a planar sheet that is bent into position to form the roof 3202 and the one or two opposed walls 3204. The walls are configured upon the lock 3200 such that the walls 3204 do not engage the body 3102 of the keeper 3100, i.e. the walls are disposed outboard of the planes that extend through the body of the keeper 3100, such that the walls 3204 do not interact with the body of the keeper, and only the roof 3202 interacts with the body 3102 of the keeper (when in the locking position) as depicted in FIG. 12.

The lock 3200 may be biased to the locking position with a spring 3230 (shown schematically in FIG. 11). The spring 3230 may be mounted between the lock 3200 and the keeper body 3102 or the spring may be mounted between the lock 3200 and the lever 3107. The lock 3200 may include a handle 3220 that provides a convenient position for a user to manipulate the lock 3200 to rotate the lock 3200 with respect to the body 3102 and the lever 3107. In some embodiments, the lever 3107 may include a handle 3107*z* that extends proximate to the handle 3220 and the user may urge rotation of the lock 3200 by squeezing the two handles 3220, 3107*z* together between their fingers.

As shown in FIG. 11, as the handle 3220 of the lock 3200 is manipulated, the lock 3200 rotates with respect to the lever in the direction Z, with the handle 3220 of the lock 3200 moving toward the lever 3107 (and specifically toward the handle 3107*z*, when provided), and the roof 3202 of the lock 3200 moving away from the body 3102 of the keeper.

As shown in FIG. 12, when the lock 3200 moves away from the keeper 3100, the lever 3107 is free to rotate with respect to the body of the keeper 3102 (about a pin 3112 or other connection) in the direction X. The rotation of the lever 3107 raises the lock 3200 such that when the lever 3107 is rotated toward the body 3102 of the keeper (and specifically toward the engaging portion 3108 of the body 3102), the roof 3202 of the lock 3200 is positioned above the engaging portion 3108 and therefore the roof does not contact the body 3102 of the keeper 3100. As discussed above, the one or more walls 3204 are disposed outboard of the body 3102 of the keeper, such that the walls 3204 do not interact with the body 3102. As discussed above, the rotation of the lever 3107 in the direction X, clears the lever from the aperture 1042 of the logistics track, which allows the keeper 3100 to be slid vertically within the aperture, and upon release of the lower edge 1042*a* from the lower indent 3103, the keeper body 3102 can rotate to allow the upper tooth 3105 to clear the aperture.

While the preferred embodiments of the disclosed have been described, it should be understood that the invention is not so limited and modifications may be made without departing from the disclosure. The scope of the disclosure is defined by the appended claims, and all devices that come within the meaning of the claims, either literally or by equivalence, are intended to be embraced therein.

The invention claimed is:

1. A strap for use in accessing a cargo compartment, comprising:
   a fitting configured to engage a hole in a logistics track;
   the fitting comprising a keeper with one or more fingers that extend from opposite sides of a bottom portion of a body of the keeper, and a ring that rotatably extends therefrom, the fitting comprises a lever that is pivotably connected to a body of the keeper, and a lock that selectively restricts rotation of the lever with respect to the body, wherein the lock is a screw that is threadably received through the lever, such that when the screw is in a first position, the screw restricts rotation of the lever with respect to the body, and when the screw is moved to a second position with respect to the lever, the lever is free to rotate with respect to the body; and an elongate strap that is fixed to the ring, wherein the elongate strap extends to a free end portion, the elongate strap extends between a first end portion and a second end portion.

2. The strap of claim 1, wherein, when the keeper is positioned within the hole in the logistics track such that when the one or more fingers of the keeper are disposed in conjunction with top and bottom edges of the hole, the lever is pivotable between a restricting position that prevents sliding movement of the keeper within the hole, and a release position where the lever is withdrawn from the hole to allow the keeper to slide within the hole.

3. The strap of claim 1, wherein the screw has a head and a shaft, wherein the screw can be rotated such that the head is translated to a second different position where the lever is free to rotate with respect to the body.

4. The strap of claim 1, wherein the elongate strap extends to a plurality of free end portions, each of the plurality of free end portions configured to be independently manipulated by a hand of the user.

5. The strap of claim 1, wherein the plurality of free end portions each are positioned a different distance from the fitting along the strap.

6. The strap of claim 1, wherein the fitting is configured to engage holes defined in "A" track.

7. The strap of claim 1, wherein the fitting is configured to engage holes defined in "E" track.

8. A device for attaching a load to a fixed track, comprising:

a fitting configured to engage a hole in a fixed logistics track;

the fitting comprising a keeper with one or more fingers that extend from opposite sides of a bottom portion of a body of the keeper, the fitting comprises a lever that is pivotably connected to the body, the fitting further comprises a lock that selectively restricts rotation of the lever with respect to the body, wherein the lock is a screw that is threadably received through the lever, such that when the screw is in a first position, the screw restricts rotation of the lever with respect to the body, and when the screw is moved to a second position with respect to the lever, the lever is free to rotate with respect to the body.

9. The device of claim 8, wherein, when the keeper is positioned within the hole in the logistics track such that the one or more fingers of the keeper are disposed in conjunction with top and bottom edges of the hole, the lever is pivotable between a restricting position that prevents sliding movement of the keeper within the hole, and a release position where the lever is withdrawn from the hole to allow the keeper to slide within the hole.

10. A device for attaching a load to a fixed track, comprising:

a fitting configured to engage a hole in a fixed logistics track;

the fitting comprising a keeper with one or more fingers that extend from opposite sides of a bottom portion of a body of the keeper, the fitting comprises a lever that is pivotably connected to the body, the fitting further comprises a lock that selectively restricts rotation of the lever with respect to the body, wherein the lock is a threaded shaft that is mounted upon the keeper, wherein a head is disposed upon the shaft, such that when the head is in a first position rotation of the lever is restricted, and when the head is in a second different position, the lever is free to rotate with respect to the body.

11. A device for attaching a load to a fixed track, comprising:

a fitting configured to engage a hole in a fixed logistics track;

the fitting comprising a keeper with one or more fingers that extend from opposite sides of a bottom portion of a body of the keeper, the fitting comprises a lever that is pivotably connected to the body, the fitting further comprises a lock that selectively restricts rotation of the lever with respect to the body, wherein the lock comprises a shaft and a head that is movable thereon, wherein the head is biased to a position to restrict rotation of the lever with respect to the body.

12. The device of claim 11, wherein the head can be translated to a second different position where the lever is free to rotate with respect to the body.

* * * * *